United States Patent [19]

Bushnell

[11] Patent Number: 4,856,950

[45] Date of Patent: Aug. 15, 1989

[54] RE-USABLE PLASTIC DRIVE RIVETS

[75] Inventor: Raymond N. Bushnell, Newbury, England

[73] Assignee: ITW, Ltd., Camberley, England

[21] Appl. No.: 156,884

[22] Filed: Feb. 18, 1988

[51] Int. Cl.⁴ .............................................. F16B 13/06
[52] U.S. Cl. ........................................ 411/41; 411/51; 411/72
[58] Field of Search ........................ 411/51, 53, 40–42, 411/907, 908, 44, 45, 49, 50, 69, 71, 72, 414, 423, 948

[56] References Cited

U.S. PATENT DOCUMENTS

| 2,159,580 | 5/1939 | Zifferer | 411/51 |
| 3,196,733 | 7/1965 | Cohen et al. | 411/51 |
| 3,417,653 | 12/1968 | Staats et al. | 411/69 |
| 3,765,295 | 10/1973 | Ptak | 411/41 |
| 4,233,881 | 11/1980 | Carrier | 411/50 |
| 4,269,246 | 5/1981 | Larson et al. | 411/403 X |
| 4,642,010 | 2/1987 | Bradley et al. | 411/72 X |
| 4,648,766 | 3/1987 | Wollar | 411/45 X |

FOREIGN PATENT DOCUMENTS

| 857142 | 11/1952 | Fed. Rep. of Germany | 411/72 |
| 1534025 | 1/1969 | Fed. Rep. of Germany | 411/72 |
| 2114596 | 11/1971 | Fed. Rep. of Germany | 411/72 |
| 2268182 | 11/1975 | France | 411/41 |
| 640451 | 7/1950 | United Kingdom | 411/72 |
| 1122512 | 8/1968 | United Kingdom | 411/41 |
| 1301516 | 12/1972 | United Kingdom | 411/72 |

Primary Examiner—Lloyd A. Gall
Attorney, Agent, or Firm—Schwartz & Weinrieb

[57] ABSTRACT

A re-usable plastic drive rivet is of the type comprising an axially extending shank in association with an axially extending drive pin which is axially drivable into a bore extending axially through the shank. In order to permit release of the entire drive rivet by means of an unscrewing operation, without damaging the workpieces to which the drive rivet is secured, the outer surface of the shank has a thread formation thereon with the outer surface of the drive pin having a non-cylindrical outline complementary to a similar non-cylindrical peripheral outline of the interior wall of the bore. The non-cylindrical outlines can be substantially cylindrical apart from inter-engagable axial ribs and grooves. The shank can be integrally formed with the drive pin through means of frangible connections, but alternatively the shank can be preassembled with the drive pin by inserting the drive pin into the bore through the shank.

12 Claims, 2 Drawing Sheets

RE-USABLE PLASTIC DRIVE RIVETS

FIELD OF THE INVENTION

The present invention relates to rivets which are formed of plastic material and which are to be securable by means of a driving action yet which are to be releasable by means of an unscrewing action so as to permit re-use of the rivets.

BACKGROUND OF THE INVENTION

It is believed that the first re-usable plastic drive rivets were those disclosed by our parent company in their British Pat. No. 2,051,288.

In accordance with those rivets, amongst other necessary features, a drive pin is associated with a headed shank, and is receivable within a bore extending axially through both the head and the shank. The intention is that the shank is passed through aligned apertures defined within respective workpieces until the head of the shank abuts one side of the workpieces, the drive pin then being forced into the bore by means of an axially directed blow so as to expand the shank against the other side of the workpieces. To facilitate such expansion, the shank is split along its length and the bore is narrowed so that the shank is forced radially outwardly as the drive pin is driven axially therethrough. The re-usability is achieved by providing thread means upon the drive pin and interrupted complementary thread means within the bore. Other design features ensure that the drive pin is drivable axially into the bore without the bore thread means being sheared off by the drive pin thread means, thereby permitting the drive pin to be subsequently removed from the bore by means of an unscrewing operation.

A disadvantage of the aforenoted rivets, particularly in the usual situation where the shank presents peripherally extending shoulders which are deflected inwardly as they are passed through the workpiece apertures before returning to their initial configuration with a snap action as they emerge from the workpiece apertures, is that the shank can be difficult to remove even after the drive pin has been removed from the shank.

In practice, a flat bladed screw driver can be inserted between the head of the shank and the adjacent workpiece so as to pry the shank out of the adjacent workpiece. This procedure often results in scratch marks being generated upon the adjacent workpiece in locations which are not hidden by means of the head when the rivet is re-used. If the adjacent workpiece is formed of a cloth-like material, it can easily be torn while removing the shank therefrom.

A particular situation in which this difficulty has been encountered has been when using rivets to fix a roof lining to a supporting panel for the roof lining of a vehicle. It is sometimes necessary to remove the roof lining from the supporting panel in order to expose electrical wiring for example, and the rivets must therefore be totally removed from the roof lining and the supporting panel. However, the roof lining is usually formed of pressed fibers with a plastic coating which is very easily ripped or otherwise visibly damaged.

A re-usable plastic drive rivet, in accordance with the present invention, comprises an axially extending shank in association with an axially extending drive pin, an outer surface of the shank having thread means thereon and an outer surface of the drive pin being of non-cylindrical outline, the drive pin being drivable axially into a bore which extends axially through the shank and has a non-cylindrical peripheral surface complementary to that of the drive pin.

Preferably, an end of the shank initially adjacent to the drive pin is formed as an enlarged head. In use, the shank is passed through aligned apertures defined within respective workpieces until the head of the shank abuts the workpiece adjacent thereto. In the situation where a vehicle roof lining is to be fixed to a supporting panel, the roof lining (initially disposed closer to the rivet of the present invention) may not have been formed with an aperture until the shank is punched there-through, whereas the supporting panel (initially disposed further from the rivet of the present invention) may already have been formed with a circular or slotted aperture. The drive pin is then forced into the bore of the shank by means of an axially directed blow so as to expand the shank radially outwardly against the workpieces. In particular, as a consequence of driving the drive pin into the bore of the shank, the thread means formed upon the shank is forced radially outwardly into firm contact with at least one of the workpieces, such as the supporting panel for the roof lining.

If it is subsequently necessary to remove the shank from the workpieces, it is merely necessary to apply an appropriate torque to the drive pin in the withdrawal or counterclockwise direction. The torque is transferred from the drive pin to the headed shank, means of the complementary non-cylindrical outlines of the drive pin and the bore wall of the headed shank. The thread means formed upon the shank then, in turn, operate to unscrew the shank from the workpieces.

It is not necessary for the drive pin and the headed shank to be unscrewed with respect to each other only when they have both been completely removed from the workpieces. Once the head of the shank has been moved clear of the adjacent workpiece, it might be possible to pull the drive pin out of the bore of the shank thus removing the expansion force from the shank and permitting easier unscrewing of the shank from the workpiece. The head of the shank may be gripped by means of, a pliers, for example, without damaging the adjacent workpiece once there is sufficient clearance therebetween. Alternatively, the head of the shank may be shaped with flats so as to facilitate the gripping thereof by means of a spanner.

Preferably, the thread means extends substantially the entire length of the shank. The thread means may be one or more helical threads which may have a sharp crest configuration. Preferably, however, in order to provide improved surface contact between the shank and at least one of the workpieces, the thread means has a crest configuration which is substantially flat within a particular section thereof along the length of the shank.

The non-cylindrical outlines of the bore wall and the drive pin may be substantially cylindrical apart from including at least one axially extending discontinuity, in which case the bore wall may include a plurality of the discontinuities in the form of ribs and the drive pin may include a complementary plurality of the discontinuities in the form of grooves, or vice versa, but the bore wall and the drive pin may have polygonal, oval or any other non-cylindrical outlines.

Preferably the end of the drive pin initially disposed remote from the headed shank is itself formed with an enlarged head. The drive pin head may have flat torque transmission means for facilitating the transference thereto of an applied torque. For example, there may be provided hexagonally arranged faces to which a spanner could be applied, or there may be a centrally arranged recess into which a screwdriver could be inserted. The drive pin head may additionally, or alternatively, include peripherally extending sealing means for facilitating circumferentially complete abutment of the drive pin head with the adjacent workpiece, even in the event that there has been a slight mis-alignment between the pin and the shank. For example, the drive pin head may include a resiliently deformable domed skirt whose free edge is intended to press against the adjacent workpiece.

It is possible for the drive pin to be preassembled with the headed shank by initially inserting the drive pin into the bore defined within the headed shank. Particularly in the situation where the drive pin is formed with an enlarged head, there is no need for the shank to be formed with its own enlarged head. In use, if the drive pin is to be fully inserted into the bore of the shank, the leading end of the drive pin may be pointed and project axially beyond the head of the shank so as to assist in the location of the pin in axial alignment with the bore of the shank, and an intermediate part of the drive pin may be undercut so as to facilitate radial inward deformation of the shank during such relative axial operation location, but the manner of operation is otherwise substantially unchanged. It is preferable, however, that the end of the drive pin initially disposed adjacent to the headed shank is integrally formed therewith in coaxial alignment with the bore defined therethrough by means of at least one frangible connection. Naturally, the one or each one of the frangible connections is broken when the drive pin is driven by means of an axially directed blow into the bore of the shank.

The shank may be split at least partly along its length, from its free end remote from its headed end, for use within circular rather than slotted apertures.

A re-usable plastic drive rivet constructed in accordance with the present invention is of special value in situations where a first workpiece which is light in weight is to be secured to a second rigid workpiece. The rigid workpiece may be formed with an aperture of a predetermined width or diameter for optimizing the expansion capability of the thread means formed upon the shank. More generally, the dimensions of the re-usable plastic drive rivet constructed in accordance with the present invention may be chosen in advance so as to be suitable for use with the intended dimensions of the workpieces.

BRIEF DESCRIPTION OF THE DRAWINGS

An example of a re-usable plastic drive rivet constructed in accordance with the present invention will now be described in more detail with reference to the accompanying drawings in which.

DETAILED DESCRIPTION OF THE PREFERRED EMBODIMENT

Figure 1:
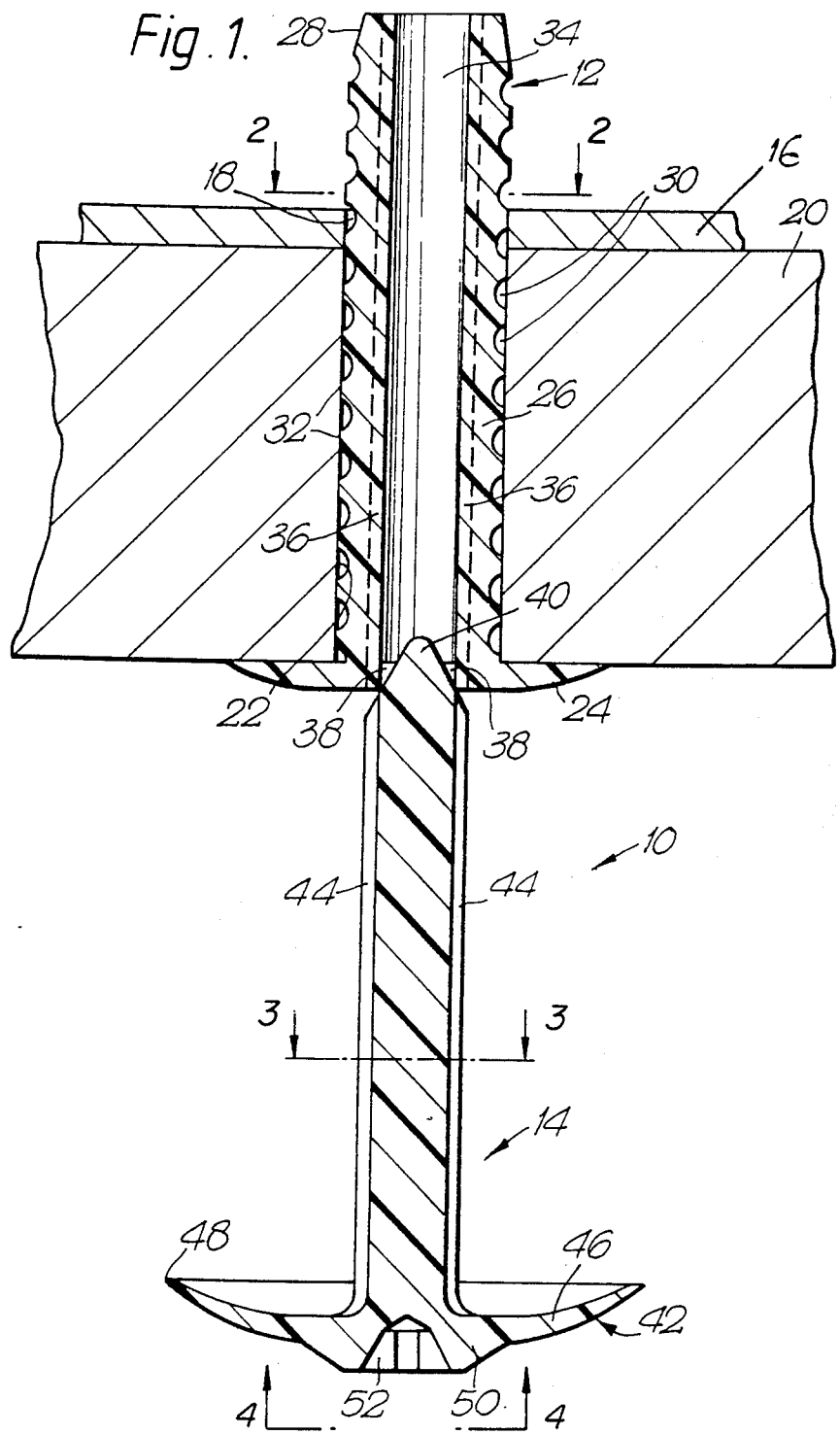
FIG. 1 is an axial section through the rivet in its as molded configuration also showing a pair of workpieces to be secured together.

A re-usable plastic drive rivet 10, in accordance with the present invention, is shown in the accompanying drawings in its as-molded configuration including an axially extending headed shank 12 integrally connected with an axially extending drive pin 14.

The drive rivet 10, which may be formed of any suitable plastic material such as, for example, nylon 6.6 is securable to and subsequently releaseable from a pair of apertured workpieces, such as, for example, a steel supporting panel 16 having an aperture 18 and a fibrous roof lining 20 having an aperture 22.

Figure 2:
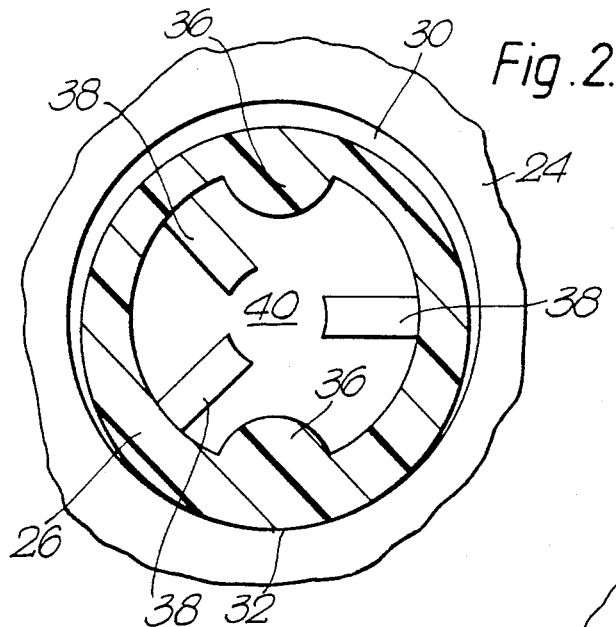
FIG. 2 is a fragmentary radial section through the rivet taken in the direction of the arrows 2—2 in FIG. 1 and on an enlarged scale.

The headed shank 12 includes a head 24 formed at one end of a shank 26. The other end of the shank 26 includes chamfering 28 so as to facilitate its insertion through the aperture 22 defined within the roof lining 20 and the aperture 18 in defined within the supporting panel 16. Substantially the entire length of the outer surface of the shank 26 is formed with thread means. In particular, the thread means includes a single helically extending groove 30 whose turns are separated by means of a substantially flat crest configuration 32. A bore 34 extends axially through the headed shank 12 along the entire length thereof. The bore 34 is of substantially cylindrical outline except for the provision of two diametrically opposed ribs 36 which also extend axially through the headed shank 12 along the entire length thereof. Each of the ribs 36 has, for example, a semi-circular outline as seen in radial section (see FIG. 2).

The headed shank 12 is initially integrally formed with the drive pin 14 by means of frangible connections in the form of three equally circumferentially spaced webs 38.

Figure 3:
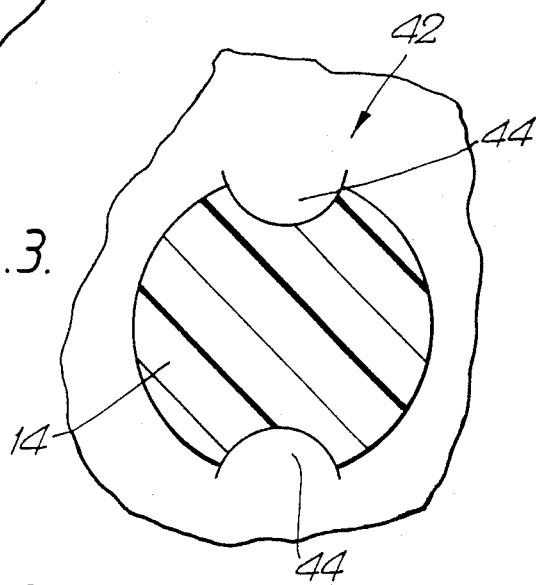
FIG. 3 is a fragmentary radial section through the rivet taken in the direction of the arrows 3—3 in FIG. 1 and on the same scale as FIG. 2.

The drive pin 14 includes a leading end formed as a blunted cone 40 to which the webs 38 are connected. A trailing end of the drive pin 14 is formed as an enlarged head 42. Substantially the entire length of the outer surface of the drive pin 14, between the blunted cone 40 and the enlarged head 42, has a substantially cylindrical outline complementary to that of the bore 34. In particular, the major part of the length of the drive pin 14 is of substantially cylindrical outline except for the provision of two diametrically opposed grooves 44, each of the grooves 44 being of semi-circular outline as seen in radial section (see FIG. 3).

The headed shank 12 and the drive pin 14 are secured by means of the frangible webs 38 in such a manner that the ribs 36 of shank 12 are in alignment with the grooves 44 of pin 14.

Figure 4:
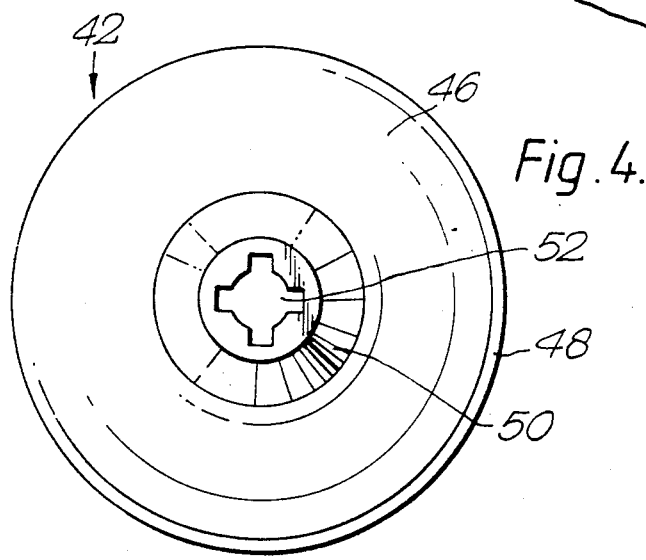
FIG. 4 is an end view of the rivet taken in the direction of the arrows 4—4 in FIG. 1 and on the same scale as FIG. 1.

The enlarged head 42 of pin 14 includes a peripherally extending and resiliently deformable domed skirt 46 having a free edge 48 and a raised central portion 50 housing a recess 52 having flat torque transmission surfaces defined therein and shaped for use with a screwdriver (see FIG. 4).

The manner of use of the drive rivet 10 of the present invention will be apparent from the foregoing description. Briefly, however, the shank 26 is pushed through the aligned apertures 22 and 18 of the respective panel and lining members 16 and 20 until the head 24 of the headed shank 12 abuts the adjacent face of the roof lining 20. The shank 26 should be disposed in a tight push fit mode within at least parts of the periphery of the aperture 18 defined within the supporting panel 16. A hammer, for example, is then used to hit the enlarged head 42 of the drive pin 14, and in so doing break the webs 38 so as to drive the drive pin 14 into the bore 34 of the shank 12. As a result, the ribs 36 become located within the grooves 44. With continued insertion of the drive pin 14 into the bore 34, the plastic material of the shank 26 is stretched radially outwardly into even tighter contact with at least parts of the periphery of the aperture 18 defined within the supporting panel 16. Insertion is completed when the head 24 of the headed shank 12 is received within the domed skirt 46 of the enlarged head 42 of the pin 14, and the free edge 48 of the enlarged head 42 sealingly abuts the adjacent face of the roof lining 20.

In order to remove the drive rivet 10 from the panel and lining members 16 and 20, it is merely necessary to insert a screwdriver into the recess 52 defined within the enlarged head 42 and apply a torque, which is transmitted through means of the grooves 44 of the drive pin 14 and the ribs 36 of the shank 26 to the thread means 30, which is thus unscrewed from the aperture 18 defined within the supporting panel 16 so as to release the roof lining 20.

It will be appreciated that the shank 26 may be made sufficiently long to be used in securing together workpieces of considerable ranges of thickness although the roof lining 20 is usually much thicker than the supporting panel 16.

It will further be appreciated that the re-usable plastic drive rivet of the present invention is not only readily securable by means of a driving action operation but is readily releasable as a complete entity by an unscrewing operation thereby facilitating the avoidance of damage to an adjacent workpiece.

Obviously, many modifications and variations of the present invention are possible in light of the above teachings. It is therefore to be understood that within the scope of the appended claims, the present invention may be practiced otherwise than as specifically described herein.

I claim:

1. A re-useable drive rivet for insertion within a bore defined within a support means, and within a bore defined within a component to be mounted upon said support means, comprising:
    an axially extending shank, having an axially extending bore defined therein, flat-crested thread means defined upon the exterior peripheral surface thereof for permitting axially directed translatable insertion of said axially extending shank within said bores defined within said support means and said component, and head means defined upon one end of said axially extending shank for engaging a surface of said component to be secured to said support means;
    axially extending drive pin means for insertion within said axially extending bore of said axially extending shank so as to radially expand said axially extending shank into secured engagement with interior peripheral wall portions of said bore defined within said support means whereby said rivet comprising said shank and drive pin means will be secured within said support means and can secure said component upon said support means;
    first axially extending means defined upon said axially extending shank for guiding said drive pin means within said axially extending shank as said drive pin means is inserted within said axially extending shank, and for transmitting torque to said axially extending shank from said axially extending drive pin means; and
    second axially extending means defined upon said axially extending drive pin means for cooperating with said first axially extending means defined upon said axially extending shank for guiding said axially extending drive pin means into said axially extending shank as said axially extending drive pin means is inserted within said axially extending shank, and for transmitting torque from said axially extending drive pin means to said axially extending shank whereby when torque is transmitted from said axially extending drive pin means to said axially extending shank in an unscrewing direction, said drive rivet comprising said axially extending shank and said axially extending drive pin means will be removable from said bores of said support means and said component as a result of the threaded cooperation defined between said flat-crested thread means of said axially extending shank and said interior peripheral wall portions of said bores defined within said support means and said component.

2. A re-useable drive rivet according to claim 1, in which the thread means extends substantially all along the length of the shank.

3. A re-useable drive rivet according to claim 1, in which:
    said first axially extending guiding and torque transmitting means of said axially extending shank comprises a plurality of axially extending ribs; and
    said second axially extending guiding and torque transmitting means of said axially extending drive pin means comprises a plurality of complementary axially extending grooves.

4. A re-useable drive rivet according to claim 1, in which an end of the drive pin means initially remote from the shank is formed as an enlarged head.

5. A re-useable drive rivet according to claim 4, in which the drive pin head means presents flat torque transmission means.

6. A re-useable drive rivet according to claim 4, in which the drive pin head means presents peripherally extending sealing means.

7. The rivet of claim 4, wherein:
    said head of said drive pin has a domed configuration which envelops said head means of said shank when said drive pin means is fully inserted within said bore of said shank.

8. The rivet of claim 5, wherein:
    said torque transmission means of said drive pin head means comprises slot means for reception of a screwdriver blade.

9. A re-useable drive rivet according to claim 1, in which an end of the drive pin means initially adjacent to the shank is integrally formed therewith in alignment with the bore therethrough by at least one frangible connection.

10. A re-useable drive rivet according to claim 1, in which the shank is initially pre-assembled with the drive pin means by having the drive pin partially disposed within the bore of the shank.

11. The rivet of claim 1, wherein:
    said shank and said drive pin means are formed from a plastic material.

12. The rivet of claim 11, wherein:
    said plastic material is nylon.

* * * * *